March 21, 1967 L. L. DRESSER 3,309,983
CONTINUOUS PLASTIC LAMINATOR
Filed Dec. 14, 1964 2 Sheets-Sheet 1
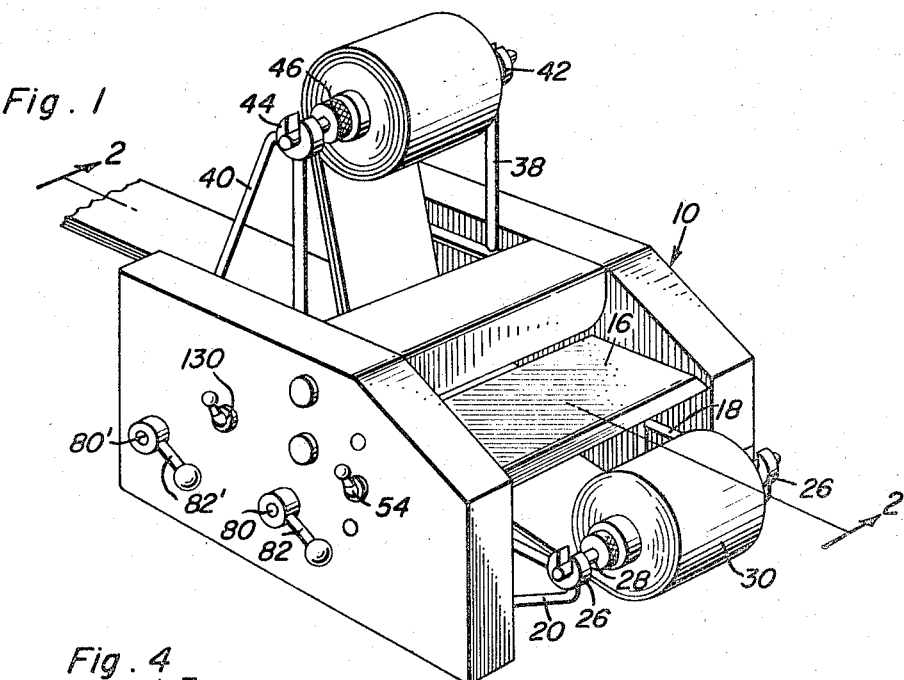
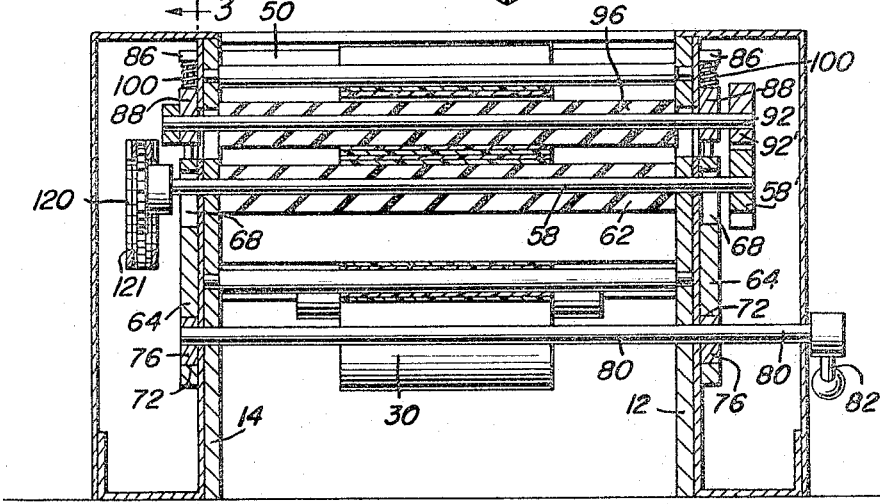
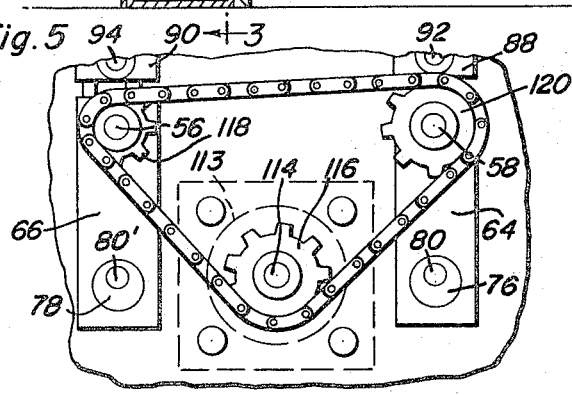
Lloyd L. Dresser
INVENTOR.

Lloyd L. Dresser
INVENTOR.

United States Patent Office 3,309,983
Patented Mar. 21, 1967

3,309,983
CONTINUOUS PLASTIC LAMINATOR
Lloyd L. Dresser, Honeoye, N.Y., assignor to D-S Industries, Inc., a corporation of New York
Filed Dec. 14, 1964, Ser. No. 418,123
4 Claims. (Cl. 100—93)

This invention relates to a novel and useful plastic laminator and more specifically to a laminator specifically adapted to laminate articles utilizing sheets of double-sided plastic for forming the lamination with the adjacent sides of the plastic having a lower melting point than the plastic of which the remote sides are constructed. In this manner, the sheets of plastic to be utilized in forming the lamination may be heated to a temperature above the temperature at which the adjacent sides soften and yet below the temperature at which the remote sides will soften whereupon the adjacent sides of the plastic sheets will become slightly fluent thereby being properly prepared to form the lamination by bonding together and to the article which is to be disposed therebetween.

Although roller-type guiding and heating elements over which the two sheets of plastic to be laminated are sometimes utilized to heat the sheets of plastic to be bonded together, the laminator of the instant invention makes use of heated stationary and generally semi-cylindrical platens for guides which are coated with a non-stick coating such as "Teflon." By this means a less complicated and expensive means of guiding and heating the plastic sheets is provided.

The main object of this invention is to provide a plastic laminator including the aforementioned improved structural features and which will be effective in laminating various types of articles between two adjacent sheets of thermoplastic material.

Another object of this invention is to provide a laminator utilizing stationary platens and thereby enabling the platens to be more readily heated by any conventional means inasmuch as the heating means may be more readily operatively connected between the source of heat and the article which is to be heated if the article is stationarily supported relative to the source of heat.

Yet another object of this invention is to provide a laminator including means for insuring that the laminated structure produced thereby will be wrinklefree and maintained in a wrinklefree state while being cooled.

A final object of this invention to be specifically enumerated herein is to provide a continuous laminator in accordance with the preceding object which will conform to conventional forms of manufacture, be of simple construction and easy to use so as to provide a device which will be economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the continuous laminator of the instant invention;

FIGURE 4 is a transverse vertical sectional view taken substantially upon the plane indicated by the sectional line 4—4 of FIGURE 2; and FIGURE 5 is a fragmentary side elevational view of the drive mechanism of the laminator.

Figure 2:
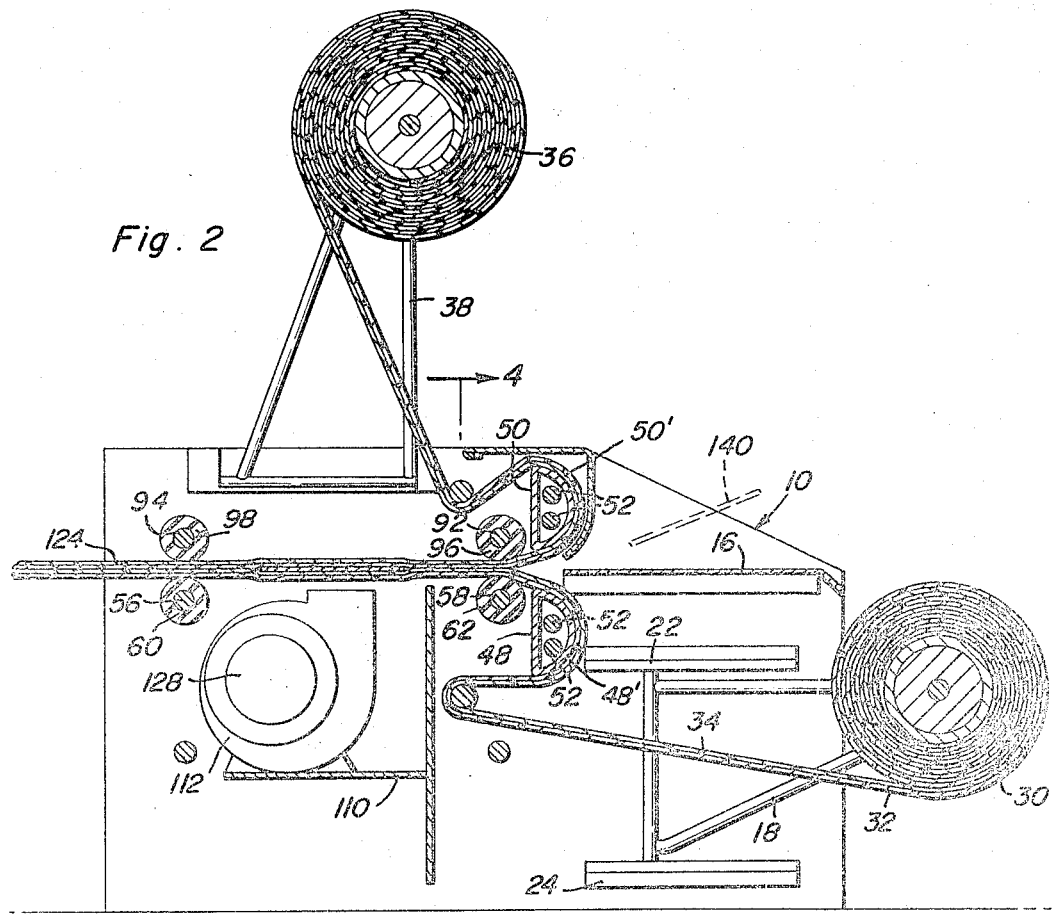
FIGURE 2 is an enlarged vertical sectional view taken substantially upon the plane indicated by sectional line 2—2 of FIGURE 1.

Referring now more specifically to the drawings the numeral 10 generally designates the plastic laminator of the instant invention. The laminator 10 includes a pair of inter-connected opposite side walls 12 and 14 having a workpiece supporting table or shelf 16 extending therebetween.

A first pair of arm members 18 and 20 are pivotally supported from the sides 12 and 14, respectively, by means of pairs of upper and lower arm supports 22 and 24. Each of the arms 18 and 20 is pivotally supported from the corresponding pair of supports 22 and 24 for rotation about an upstanding axis and the free swinging end portion of each of the arms 18 and 20 includes a journal portion 26 which rotatably supports a spindle 28 on which a length of double-sided plastic 30 is wound. The length of plastic 30 includes a first outer side 32 which will not melt at a low temperature and an inner side 34 which will melt when heated to a temperature considerably below the temperature at which the outer side 32 will melt. A second roll of sheet plastic 36 corresponding to the plastic 30 is supported from a second pair of arms 38 and 40 pivotally supported from the sides 12 and 14, respectively, for rotation about generally horizontal axis extending longitudinally of the laminator 10. The free ends of the arms 38 and 40 include journal portions 42 and 44 which journal a spindle 46 on which the roller sheet plastic 36 is wound. It is to be noted that the arms 18 and 20 may be pivoted to substantially parallel positions disposed wholly between the sides 12 and 14 when the spindle 28 is removed and also that the arms 38 and 40 may be pivoted to generally parallel horizontal positions completely received between the sides 12 and 14 and disposed below a plane containing the upper edge portions of the sides 12 and 14.

A pair of generally semi-cylindrical platens 48 and 50 extend between the sides 12 and 14 and are vertically spaced. The platens 48 and 50 each include electrical heating elements 52 and each has its heating elements 52 electrically connected to a control switch 54 which is in turn electrically connected to a suitable source of electrical potential (not shown). The electrical heating elements 52 may be thermostatically controlled if desired or it is possible that suitable control means such as rheostats may be disposed in the electrical circuits extending from the switch 54 to the electrical heating elements 52.

A pair of stationary shafts 56 and 58 are journalled from the sides 12 and 14 and the stationary shaft 56 has a first stretch roller 60 mounted thereon while the shaft 58 has a first pressure roller 62 mounted thereon.

Figure 3:
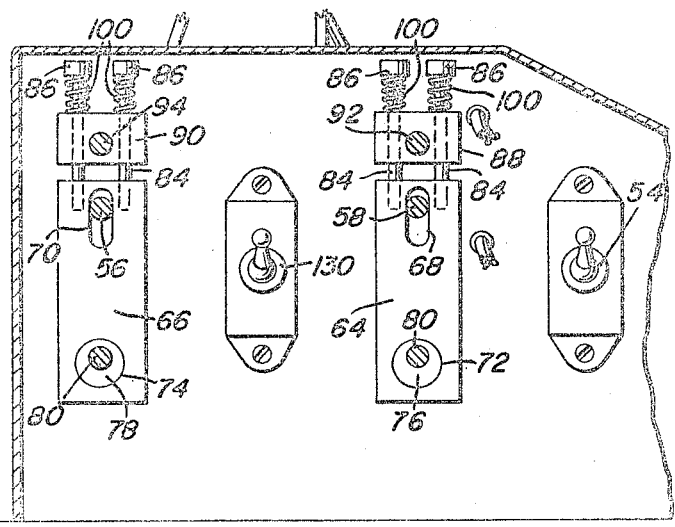
FIGURE 3 is a fragmentary vertical sectional view taken substantially upon the plane indicated by the sectional line 3—3 of FIGURE 4.

Two pairs of slides 64 and 66 having slots 68 and 70, respectively, formed therein are disposed adjacent the sides 12 and 14 and are slidably engaged therewith, the shafts 56 and 58 being slidably and rotatably received in the slots 70 and 68, respectively. The lower ends of the slides 64 and 66 have circular openings 72 and 74, respectively, formed therein and a pair of discs 76 and 78 are rotatably received within the openings 72 and 74, the discs 76 and 78 being eccentrically mounted on control shafts 80 and 80' journalled through the sides 12 and 14 and provided with operating handle levers 82 and 82'. The upper ends of the slides 64 and 66 each have a pair of guide pins 84 projecting upwardly therefrom and topped by means of diametrically enlarged heads 86. Pairs of journal blocks 88 and 90 are slidably mounted on the pairs of pins 84 carried by the slides 64 and 66, respectively, and the journal blocks 88 rotatably journal a shaft 92 while the journal blocks 90 rotatably journal the shaft 94. A second pressure roller 96 is mounted on the shaft 92 for rotation therewith and a second stretch roller 98 is mounted on the shaft 94 for rotation therewith. The journal blocks 88 and 90 are accordingly mounted for reciprocal movement longitudinally along the corresponding pairs of pins 84 and it may be seen from FIGURE 3 of the drawings that a compression spring 100 is disposed about each pin 84 and between the diametrically enlarged head portion 86 thereof and the corresponding journal block. In this manner, each of the journal blocks 88 and 90 is yieldingly urged toward the corresponding stationary shaft and by raising and lowering the guides 64 and 66 the thrust applied by the springs 100 to urge the movable shafts 92 and 94 downwardly toward the shafts 58 and 56 may be varied. It is of course to be noted that the discs 76 are mounted on the shaft 80 and that the discs 78 are mounted on a corresponding shaft 80' which is provided with an operating lever handle 82' corresponding to the handle 82.

It will be noted that the platens 48 and 50 are vertically spaced and disposed across a front portion of the laminator 10 while the pressure rolls 62 and 96 are disposed slightly to the rear of the platens 48 and 50. A suitable support 110 is supported between the sides 12 and 14 and supports a blower assembly 112. Any suitable motor means 113 may be provided and have a power output drive shaft 114 journalled from the side 14. The drive shaft 114 has a sprocket wheel 116 mounted thereon and the shafts 56 and 58 have sprocket wheels 118 and 120, respectively, mounted thereon and driven from the sprocket wheel 116 by means of an endless chain 121, the effective diameter of the sprocket wheel 118 being slightly smaller than the effective diameter of the wheel 120 whereby the stretch rollers 60 and 98 will have a slight tendency to stretch the work 124 as it passes through the laminator 10 and is being cooled by the blower assembly 112 during its movement from the pressure rollers 62 and 96 to the stretch rollers 60 and 98, the shafts 92 and 94 being driven from the shafts 58 and 56 by means of meshed gear wheels 58' and 92' carried by the shafts 56 and 58 and the shafts 92 and 94, the gear wheels 58' and 92' being meshed with each other in a manner enabling limited vertical shifting of the shafts 92 and 94 relative to the shafts 58 and 56.

The blower assembly 112 includes an electric motor 128 which may be suitably electrically connected to a suitable electrical control switch 130 and it is to be noted that the control switch 130 may also be utilized to electrically connect the electrical motor 113 to a suitable source of electrical potential.

In operation, the rolls of plastic 30 and 36 are first mounted as illustrated in FIGURE 2 of the drawings and threaded about the platens 48 and 50 and between the pressure rollers 62 and 96 and thereafter between the stretch rollers 60 and 98. Then, the switch 54 may be actuated to effect operation of the heating elements 52 whereupon the inner sides 34 of the plastic sheets will be heated so as to be rendered somewhat fluent. Thereafter, the switch 130 may be actuated to actuate the blower assembly 112 and to effect rotation of the drive shaft 114. As soon as the laminator 10 has reached its proper operating temperature the article 140 to be laminated may be dropped on the table 16 and moved into contact with the inner sides 34 of the sheets of plastic 30 and 36 as they pass between the pressure rolls 62 and 96. Of course, by this time the inner sides 34 of the sheets of plastic 30 and 36 have been heated to a somewhat fluent state and as soon as the plastic sheets 30 and 36 pass between the pressure rolls 62 and 96, the confronting sides thereof are fused together completely sealing the article 140 therebetween. Then, as the fused sheets 30 and 36 move toward the stretch rollers 60 and 98, the stretch rollers tend to stretch the work 124 and prevent it from wrinkling while it is being cooled by the blower assembly 112.

From the foregoing description it is believed quite evident that the temperature of the platens 48 and 50 may be readily controlled by any suitable means and that the pressure applied by the pressure rollers 62 and 96 and the stretch rolls 60 and 98 may be readily adjusted by means of the lever handles 82 and 82', respectively. Further, the semicylindrical portions 48' and 50' of the platens 48 and 50 are coated with a nonstick coating such as "Teflon" or the like and therefore the sheets 30 and 36 slide smoothly thereover without sticking to the platens even though the latter are heated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A continuous plastic laminator adapted to laminate articles such as cards and the like between sheets of double sided plastic including adjacent sides which may be rendered slightly fluent at a temperature lower than a temperature at which the remote sides are rendered fluent, said laminator including support means adapted to journal a pair of rolls on which said sheets are wound, a pair of stationary and elongated generally parallel guides supported from said support means and defining a pair of transversely arcuate guide surfaces facing in the same general direction and spaced slightly apart in a plane disposed normal to said direction, said surfaces being defined by a non-stick material and being adapted to have said sheets of plastic passed thereabout from said rolls for movement of said sheets over said guide surfaces with said remote sides of said sheets in contact therewith toward the adjacent edge of said surfaces, heating means disposed behind said guide surfaces and in good heat transfer relation therewith for heating the latter and the remote sides of said sheets engaged therewith and therefore also heating said adjacent sides to a temperature less than the temperature to which the remote sides of said sheets are heated, a pair of driven resilient pressure rollers generally paralleling said guides and journaled from said support means in position closely adjacent said adjacent edges and spaced slightly from said guides in the other direction for compressively engaging and pulling said sheets over said guide surfaces and thereafter between said adjacent edges, said pressure rollers being yieldingly urged into peripheral contact with each other, a pair of juxtaposed and generally parallel driven resilient stretch rollers journalled from said support means and positioned relative to said pressure rollers to receive said sheets after passing between said pressure rollers, said stretch rollers being adapted to frictionally grip said remote sides of said sheets and being driven at a slightly greater peripheral speed than said pressure rollers, and cooling means disposed between said pressure and stretch rollers along the intended path of said sheets extending between said pressure and stretch rollers and operative to cool said sheets in the portions thereof extending between said pressure and stretch rollers along said path, said laminator being free of means operative to hasten cooling of said sheets prior to their passing from said pressure rollers and free of means operative to heat said sheets after passing between said pressure rollers.

2. The combination of claim 1 wherein said support means includes means journalling one of said pressure rollers from said support means for lateral shifting of the axis of rotation of said one pressure roller toward and away from the axis of rotation of the other pressure roller.

3. The combination of claim 2 wherein the means yieldingly urging said one roller toward said other roller includes means for varying the thrust by which said one roller is urged toward said other roller.

4. The combination of claim 1 wherein said elongated members are hollow and at least partially enclose said heating means.

References Cited by the Examiner
UNITED STATES PATENTS

| | | | |
|---|---|---|---|
| 2,224,370 | 12/1940 | Wescott | 156—322 |
| 2,433,965 | 1/1948 | Upson | 156—555 X |
| 3,163,104 | 12/1964 | Lapham | 100—93 X |
| 3,185,073 | 5/1965 | Van Hartesveldt et al. | 100—93 |

LOUIS O. MAASSEL, *Primary Examiner.*